United States Patent [19]
Wang

[11] Patent Number: 5,914,765
[45] Date of Patent: Jun. 22, 1999

[54] EYEGLASSES FOR THOSE WHO CAN SEE AND READ THINGS CLEARLY ONLY AT DIFFERENT FOCUSES

[76] Inventor: Chia Hung Wang, P.O. Box 82-144, Taipei, Taiwan

[21] Appl. No.: 08/989,641

[22] Filed: Dec. 12, 1997

[51] Int. Cl.⁶ ...................................................... G02C 7/12
[52] U.S. Cl. ................................................ 351/49; 351/41
[58] Field of Search .................................. 351/49, 41, 47, 351/48, 57, 58, 158; 359/465, 483

[56] References Cited

U.S. PATENT DOCUMENTS 5,663,779  9/1997  Karasawa .................................... 351/49

*Primary Examiner*—Hung Xuan Dang
*Attorney, Agent, or Firm*—A & J

[57] ABSTRACT

A pair of eyeglasses includes a focus adjusting device including an auxiliary frame formed with two lens frames, two annular ring-like wheels rotatably fitted within the two lens frames, a flexible loop member connecting the two annular ring-like wheels, two lenses fitted in the two annular ring-like wheels, an engaging plate fixedly mounted on an intermediate portion of an inner side of the auxiliary frame and provided with a hook, and a main frame provided with a pair of temples for fitting over ears of a user and having two lens frames in which are fitted two lenses, the main frame having an inner side being provided with a recess dimensioned to receive the hook of the engaging plate, whereby the eyeglasses can be adjusted to change the focus as desired.

1 Claim, 4 Drawing Sheets

5,914,765

EYEGLASSES FOR THOSE WHO CAN SEE AND READ THINGS CLEARLY ONLY AT DIFFERENT FOCUSES

BACKGROUND OF THE INVENTION

1. Field of the Invention

This invention is related to a pair of eyeglasses and in particular to eyeglasses which can be adjusted to change the focus.

2. Description of the Prior Art

Although the eye is a marvelously sophisticated device, it does not always work perfectly. If the eyeball is slightly too large or too small, for example, the lens cannot focus properly on the retina. Just like a magnifying glass, the lens focuses light onto the retina, the film of sensitive cells on the back of the eyeball. If the light comes from a nearby object, making it difficult to focus, the muscles around the lens can squeeze it into a different shape, allowing it to bend or refract the light properly. This process is called accommodation. As the human eye ages, the lens becomes stiffer and harder to accommodate. For this type of faulty vision, the solution is a pair of eyeglasses. However, the conventional eyeglasses cannot be adjusted to change the focus thereby making it necessary for one who can see and read things clearly only at different focuses to prepare two or more pairs of eyeglasses in order to adapt to various conditions.

Therefore, it is an object of the present invention to provide a pair of eyeglasses which can be adjusted to change the focus as desired.

SUMMARY OF THE INVENTION

This invention is related to a pair of improved eyeglasses for those who can see and read things clearly only at different focuses.

It is the primary object of the present invention to provide a pair of eyeglasses which can be adjusted to change the focus.

It is another object of the present invention to provide a pair of eyeglasses which is simple in construction.

It is still another object of the present invention to provide a pair of eyeglasses which is facile to assemble.

It is still another object of the present invention to provide a pair of eyeglasses which is low in cost.

It is a further object of the present invention to provide a pair of eyeglasses which is easy to maintain.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numberals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
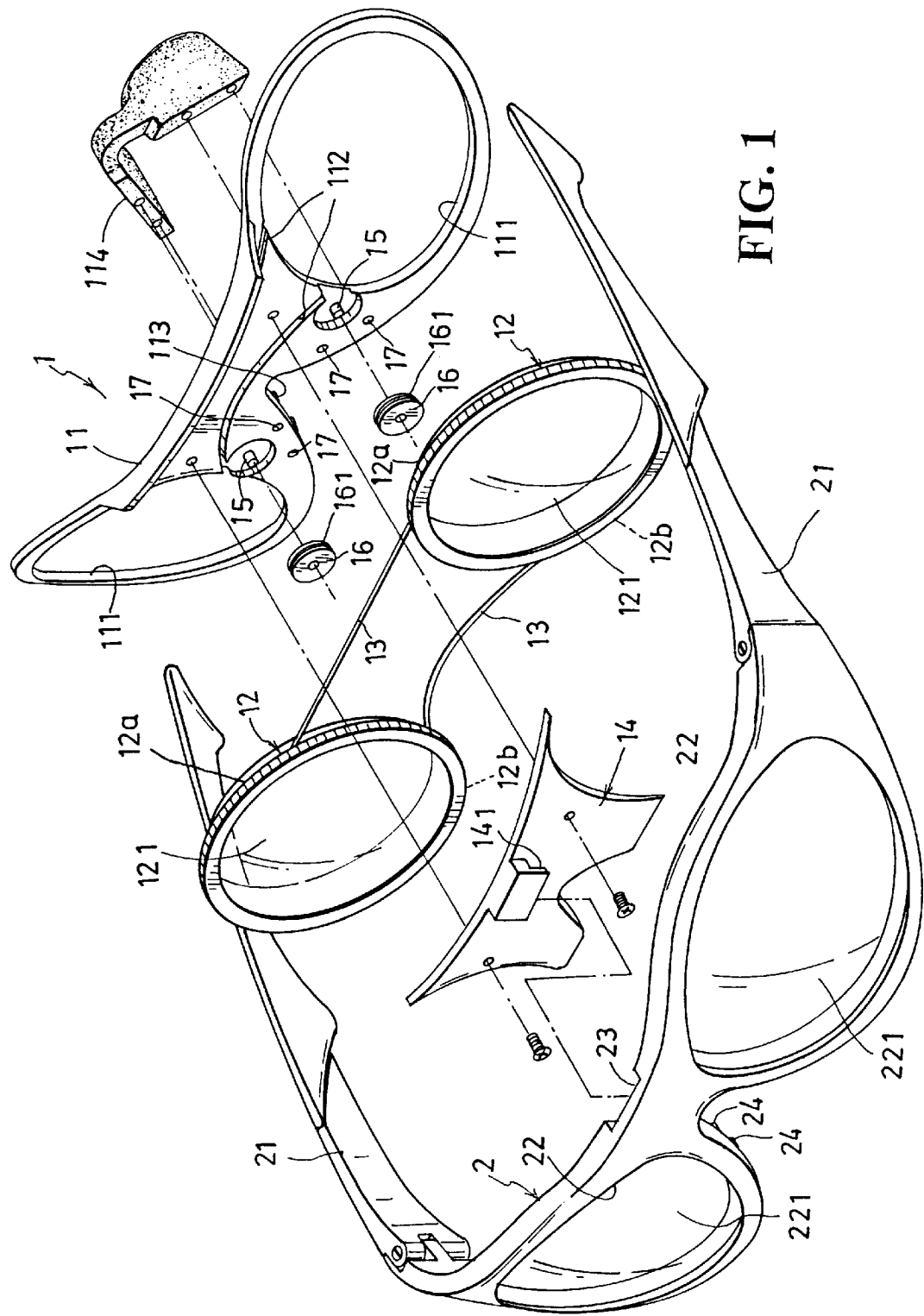
FIG. 1 is an exploded view of a pair of eyeglasses according to the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
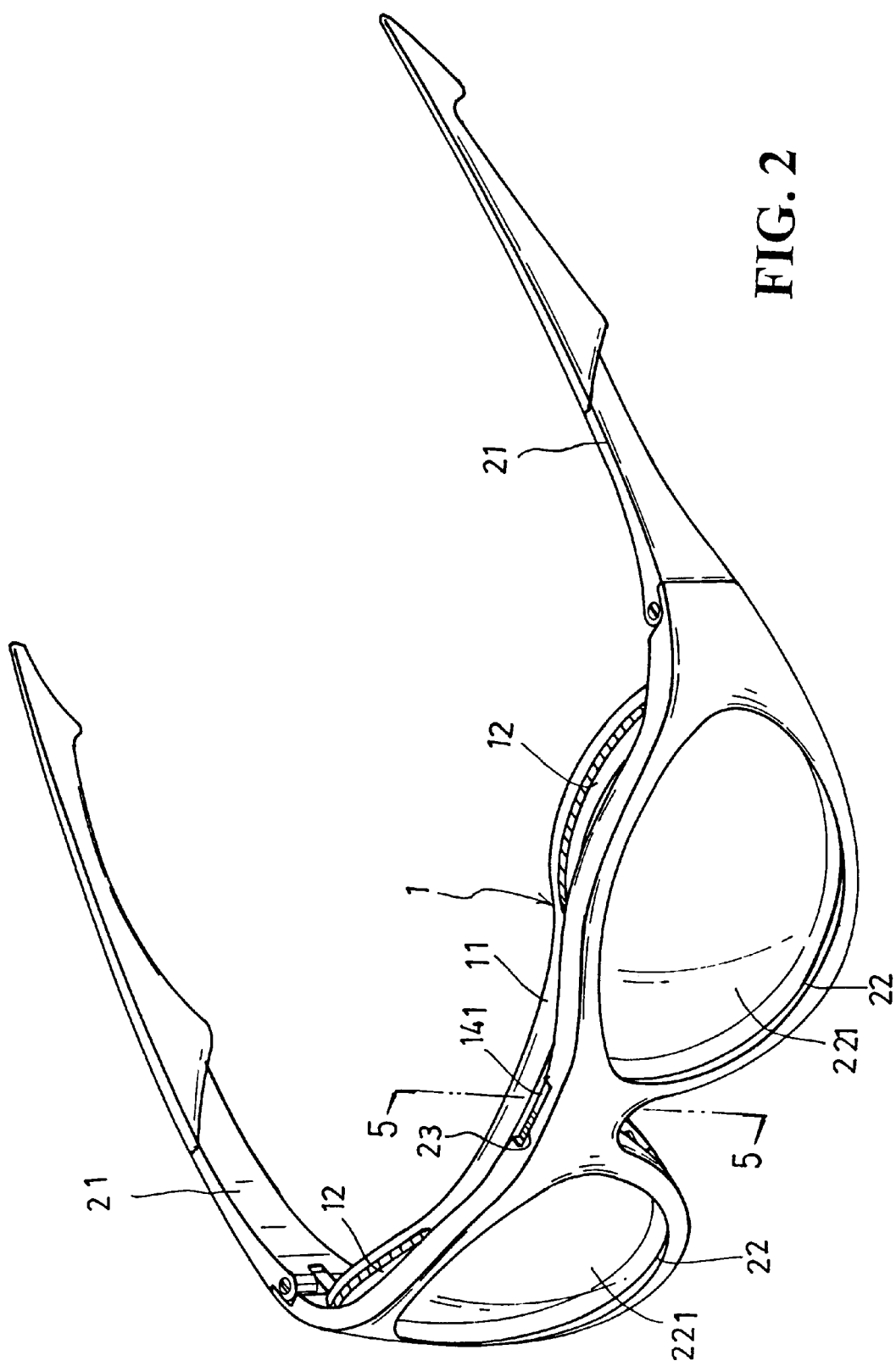
FIG. 2 is a perspective view of the eyeglasses.

With reference to the drawings and in particular to FIGS. 1 and 2 thereof, the eyeglasses according to the present invention generally comprises a focus adjusting device 1 and a main frame 2. The focus adjusting device 1 includes an auxiliary frame 11 formed with two lens frames 111 between which there are two grooves 112, one above the other. The intermediate portion of the auxiliary frame 11 has a plurality of pins 113 for engaging with a nose pad 114. In the two lens frames 12 of the auxiliary frame 11 are rotatably fitted two annular ring-like wheels 12 which are connected by a flexible loop member 13 so that the two wheels 12 will be rotated in unison. A lens 121 is fitted in each of the annular ring-like wheels 12. An engaging plate 14 is fixedly mounted on the intermediate portion of the auxiliary frame 11 to cover the grooves 112 thereby protecting the flexible loop member 13. The outer side of the engaging plate 14 is formed with a hook 141 adapted to engage with the main frame 1.

However, it should be noted that the flexible loop member 13 may be replaced with two flexible wires, one connecting the upper rims 12a of the two wheels 12 and the other connecting the lower rims 12b of the two wheels 12.

The auxiliary frame 11 is provided with two pins 15 extending outwardly perpendicularly to a plane through the auxiliary frame 11, on each of which is pivotally mounted a roller 16. The roller 16 is formed with a groove 161 along its circumference for guiding the flexible wire loop 13 thereby smoothing the rotation of the wheels 12.

Figure 3:
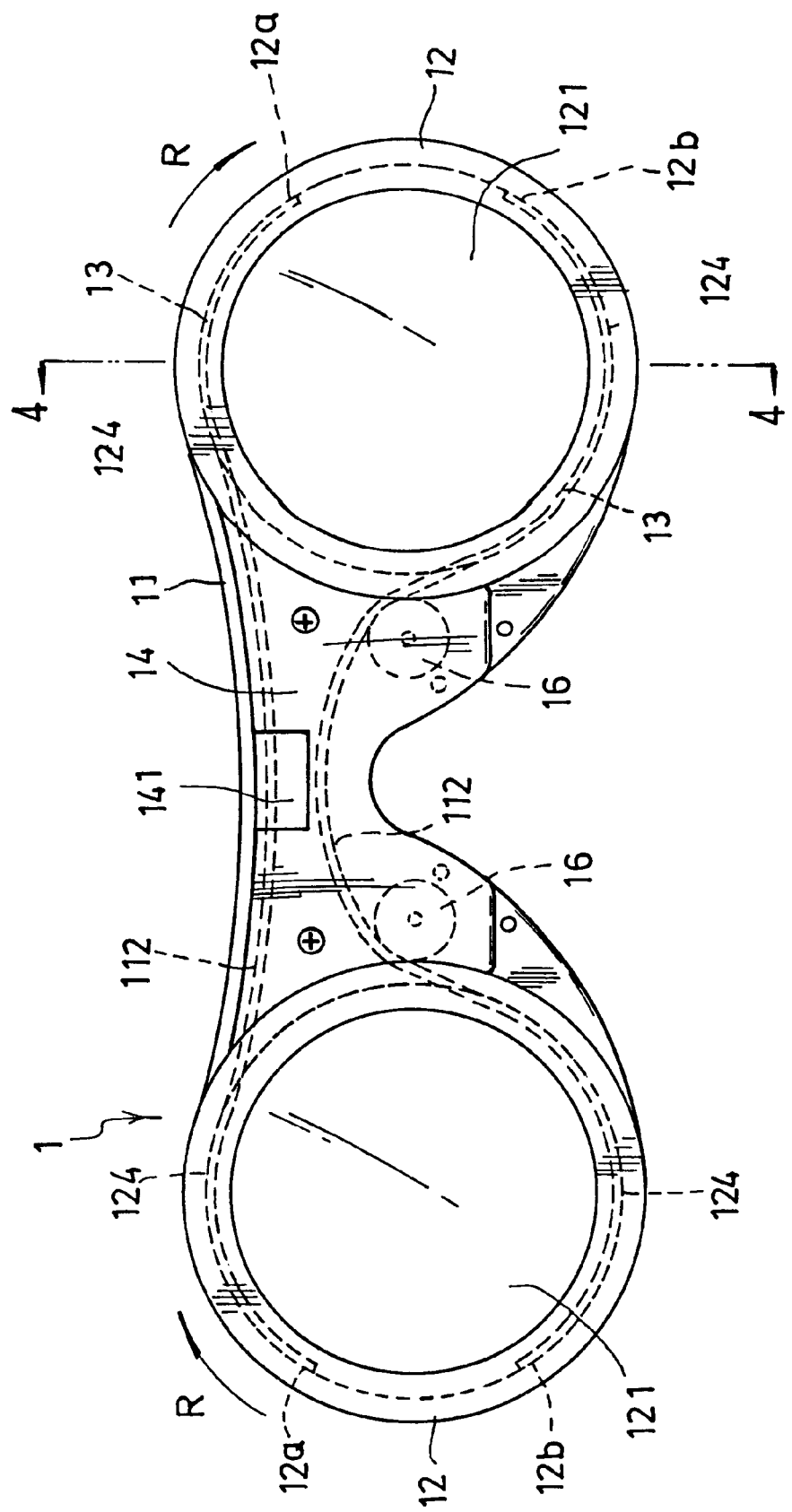
FIG. 3 is a front view of the focus adjusting device.
Figure 4:
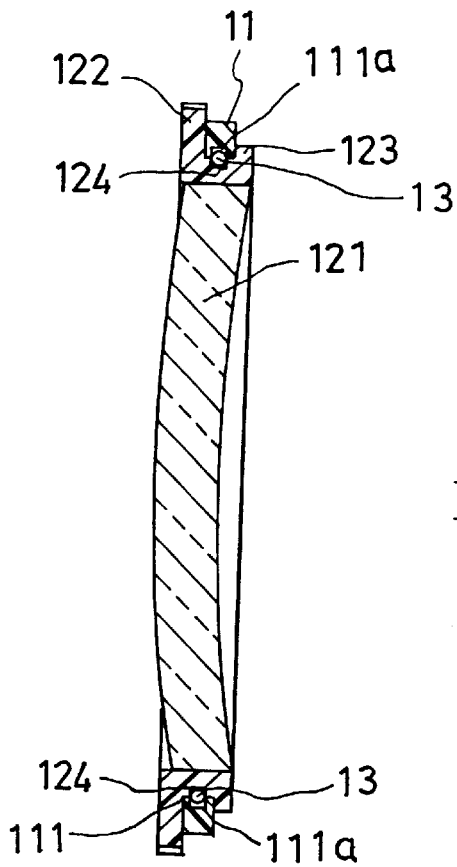
FIG. 4 is a sectional view taken along line 4—4 of FIG. 3.
Figure 5:
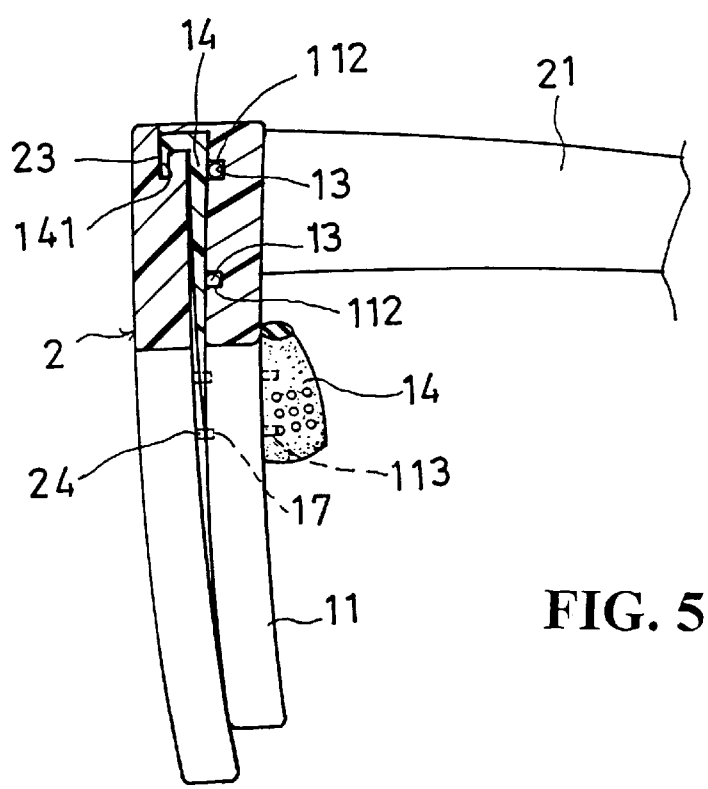
FIG. 5 is a sectional view taken along line 5—5 of FIG. 3.

Referring to FIGS. 1, 3 and 4, the circumference of the wheel 12 is formed with a front edge 122, a rear edge 123, and a groove 124 between the front and rear edges 122 and 123. The wheel 12 is fitted into each lens frame 11 of the auxiliary frame 11, with its groove 124 receiving the inner edge of the lens frame 11. The inner edge of the lens frame 11 has a groove 111a. The flexible loop member 13 is fitted within the space formed between the groove 111a of the lens frame 11 and the bottom of the groove 124 of the wheel 12. The outer edge of the wheel 12 is knurled so as to make it easier to turn.

The main frame 2 is provided with a pair of temples 21 for fitting over the ears of a user. The main frame 2 also has two lens frames 22 in which are fitted two lenses 221. The rear side of the intermediate portion of the main frame 2 has a groove 141 adapted for engaging with the hook 141 of the engaging plate 14. The main frame 2 is provided with a plurality of protuberances 24 adapted to fit into the holes 17 of the frame 11 in order to reinforce the engagement between the main frame and the auxiliary frame 1.

When desired to adjust the focus, it is only necessary to turn any one of the wheels 12. As one wheel 12 is rotated in the direction R (see FIG. 3), the flexible wire loop 13 will drive the other wheel 12 to rotate in the same direction thereby changing the positions of the lens 121 and therefore altering the focuses. In addition, the auxiliary frame 1 can be removed from the main frame 2 as desired.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A pair of eyeglasses comprising:

a focus adjusting device including an auxiliary frame formed with two lens frames, two annular ring-like wheels rotatably fitted within said two lens frames and formed with a groove dimensioned to receive an inner edge of said lens frames, a flexible loop member connecting said two annular ring-like wheels, two lenses fitted in said two annular ring-like wheels, an engaging plate fixedly mounted on an intermediate portion of an inner side of said auxiliary frame and provided with a hook, said auxiliary frame having two grooves adapted to receive said flexible loop member and provided with two rollers for guiding said flexibel loop member, said grooves being covered by said engaging plate, said inner edge of said lens frames having a groove dimensioned to receive said flexible loop member;

a main frame provided with a pair of temples for fitting over ears of a user and having two lens frames in which are fitted two lenses, said main frame having an inner side being provided with a recess dimensioned to receive said hook of said engaging plate, said main frame having protuberances adapted to fit into holes of said auxiliary frame.

* * * * *